T. W. ROUNDS.
CLAMPS FOR HOLDING AND CARRYING BAYONET-SCABBARDS, &c.

No. 171,868. Patented Jan. 4, 1876.

Witnesses.

Albert D. Bear

J. G. Perry

Inventor.

Thomas W. Rounds.

N. PETERS, PHOTO-LITHOGRAPHER, WASHINGTON, D. C.

UNITED STATES PATENT OFFICE.

THOMAS W. ROUNDS, OF PROVIDENCE, RHODE ISLAND, ASSIGNOR OF ONE-HALF HIS RIGHT TO JOHN B. HUMPHREYS, OF SAME PLACE.

IMPROVEMENT IN CLAMPS FOR HOLDING AND CARRYING BAYONET-SCABBARDS, &c.

Specification forming part of Letters Patent No. 171,868, dated January 4, 1876; application filed August 5, 1875.

*To all whom it may concern:*

Be it known that I, THOMAS W. ROUNDS, of the city and county of Providence, in the State of Rhode Island, have invented an Improved Clamp for Holding and Carrying Bayonet-Scabbards and kindred articles while the seams thereof are being sewed, of which the following is a specification:

The novel features of this invention consist in the employment of two hinged jaws, furnished with oval and tapering concaves or recesses, which, when closed together, form an oval conical chamber or mold just large enough to receive and hold the leather or stock of which the scabbards are made, when doubled over in tubular form, as carried before the needle for sewing with the edges of the scabbard projecting out together from said clamp sufficiently to form the seam, and so as to unite them at a given and corresponding distance with the angle of the scabbard the entire length.

Figure 1:
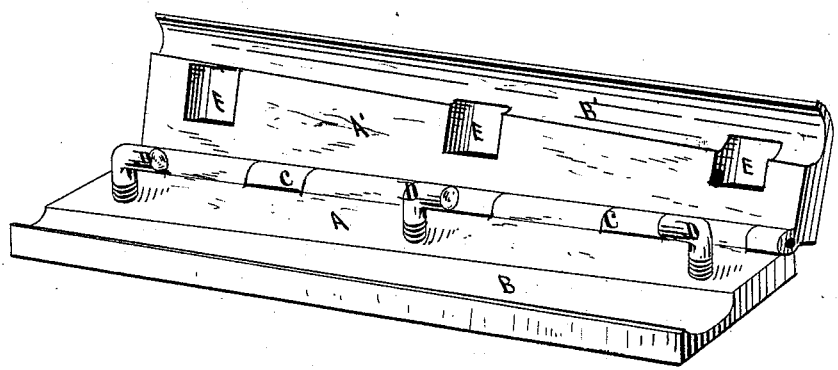
Figure 2:
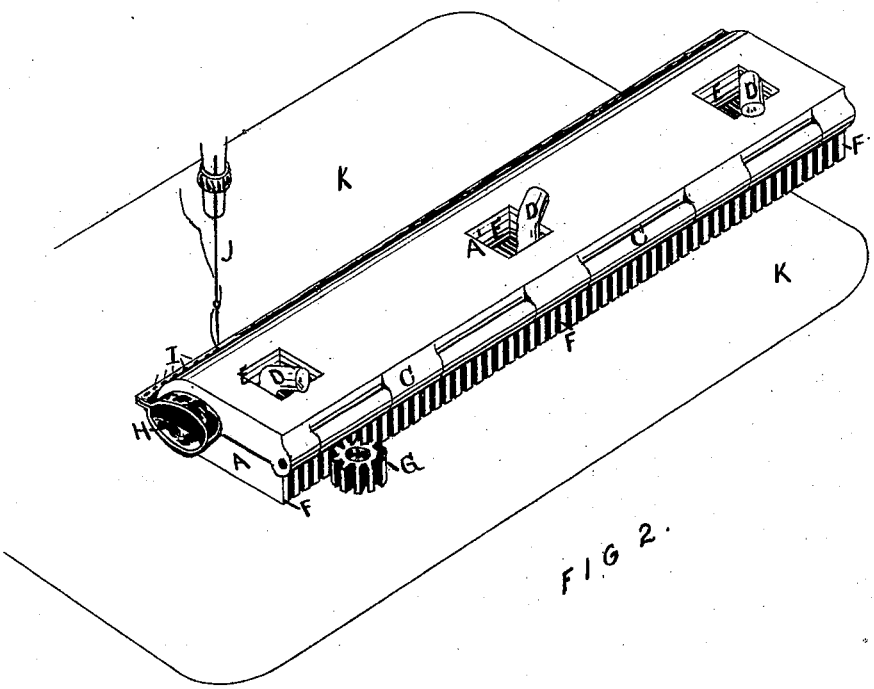

Figure 1 is a perspective view of the clamp opened; Fig. 2, a reversed view of the same closed with scabbard in position for sewing.

A A' represent the jaws; B B', the concave grooves or recesses tapering from end to end, in which the scabbard is laid and locked for sewing it; C C, the hinges; D D, the screw-buttons, threaded in the jaw A, and passing through openings E E in the jaw A', and screwed down upon the top thereof when the clamp is closed upon the scabbard for holding it. F is a gear-rack formed upon the rear side of the jaw A, and fitted to engage with the pinion G upon a shaft attached to and driven through or by the same power as the sewing-machine in which it is used.

Instead of the rack and pinion it may have a ratchet and pawl, and so arranged as to give the clamp an intermittent motion. A suitable channel or carriage may be formed for passing between the pinion and needle, and so complete uniformity in appearance and rapid production may be attained, as the rack and pinion or ratchet and pawl serve to feed the clamped scabbard forward at a speed corresponding to that of the other parts of the machine, and the seam is formed at a given distance from the edge in every instance.

This arrangement is simple, effective, and preferable to any other known mode, and it will be seen that by commencing to sew at the large end of the scabbard and recess in the clamp, and sewing toward the smaller end, instead of the other way, the scabbard will have a tendency to keep in place endwise while the work is being performed.

Having thus described this invention, I claim—

In a clamp for holding and carrying scabbards and similar articles for sewing, the hinged jaws A A', with the tapering recesses to receive and hold in form the leather or stock of which they are made, and thereby gage the edges for sewing, substantially as set forth.

THOMAS W. ROUNDS.

Witnesses:
ALBERT D. BEAN,
J. G. PERRY.